Sept. 19, 1967     T. W. WALDROP     3,342,231
FORAGE HARVESTER

Filed Aug. 3, 1965     2 Sheets-Sheet 1

INVENTOR.
THOMAS W. WALDROP
BY
ATTORNEY

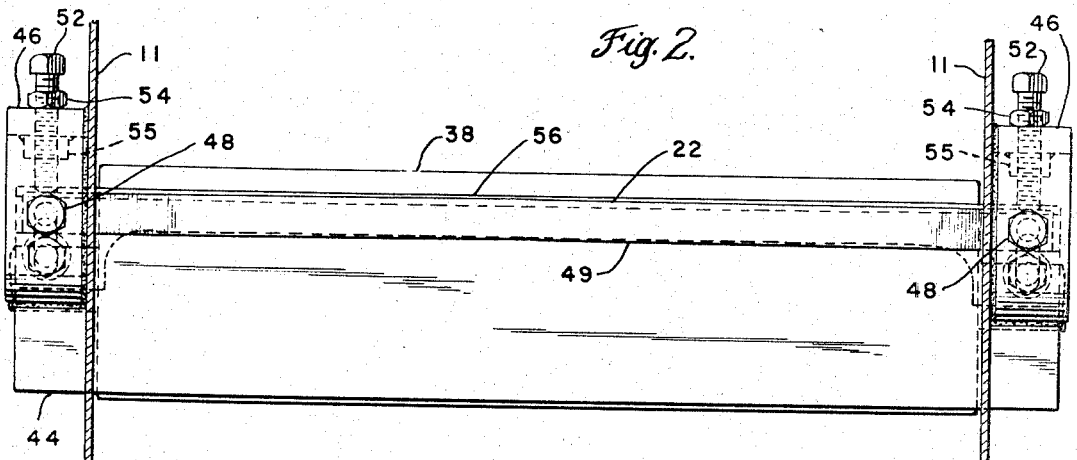
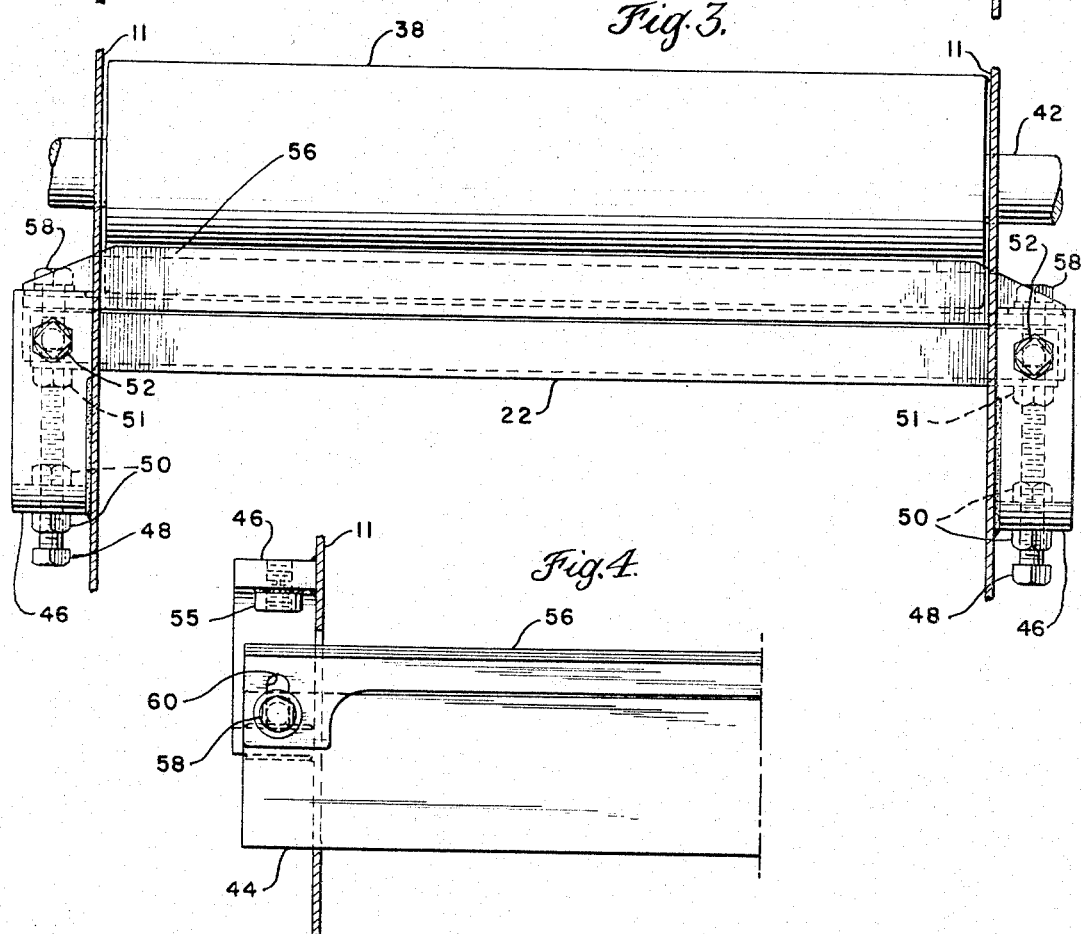

United States Patent Office 3,342,231
Patented Sept. 19, 1967

3,342,231
FORAGE HARVESTER
Thomas W. Waldrop, Ronks, Pa., assignor to Sperry Rand Corporation, New Holland, Pa., a corporation of Delaware
Filed Aug. 3, 1965, Ser. No. 476,791
8 Claims. (Cl. 146—120)

ABSTRACT OF THE DISCLOSURE

A forage harvester having a shear bar and a feed roll scraper mounted on a single support, with the shear bar and scraper each being adjustable relative to the support and independently of each other.

---

This invention relates to forage harvesters. More particularly, the invention relates to a shear bar and shear bar mounting in a forage harvester having a cutter of the reel or cylinder type.

A forage harvester, of the type to which this invention is particularly applicable, comprises generally a pick-up mechanism for delivering crop material onto an apron conveyor, feed rolls which receive material from the conveyor and deliver it to be chopped, and a cutter unit which functions to comminute the crop material and discharge it at a high velocity to a trailing wagon. The forage harvester cutter in performing the chopping function cooperates with a stationary shear bar mounted rearwardly of the feed rolls and closely adjacent the rotary cutter. One example of the type of forage harvester referred to is shown in U.S. Patent No. 2,735,469.

The shear bar in forage harvesters of the described type is rectangular in cross section and formed from very hard durable metal. It is normal to mount the shear bar to a heavy shear bar support and to secure it on the support with a plurality of spaced flat-headed screws which pass through the shear bar and are threadably received in the shear bar support. In this arrangement, the correct clearance between the shear bar and cutter is maintained by indexing the shear bar and its support toward and away from the cutter. It is also known to provide scraper means which are either integral with the shear bar mounting, or are permanently attached to the cutter housing. The main functions of the scraper means are to keep the lower feed roll free of crop material which may build up on the roll and to prevent the crop material from bridging in the space between the feed roll and the shear bar mounting.

The known shear bar mounting arrangements function well, once they are installed and correctly adjusted. However, it is difficult to keep the shear bar properly adjusted and to provide a solid shear bar mounting, since the mounting must be movable to effect the necessary adjustments. Also, when it is necessary to replace the shear bar, parts of the forage harvester must be disassembled to gain access to the mounting screws connecting the shear bar to its support. Problems also exist with the integral or permanently mounted scrapers, since there is no way to compensate for wear so that the proper clearance can be maintained between the scraper and feed roll.

Accordingly, one object of this invention is to provide a forage harvester of the character described with a novel and improved shear bar assembly.

Another object of this invention is to provide a shear bar assembly of the character described with adjustable and integral scraper means.

Another object of this invention is to provide a shear bar assembly of the character described with integral shear bar clamping means.

Another object of this invention is to provide a shear bar assembly of the character described with means to adjust the shear bar and the scraper without disassembly or necessity of access to the cutter components.

A further object of this invention is to provide a shear bar mounting of the character described which prevents chatter in the shear bar.

A still further object of this invention is to provide a shear bar mounting of the character described which is of simple and durable construction and which efficiently obtains the foregoing objects.

Other objects of this invention will be apparent hereinafter from the specification and from the recital in the appended claims.

In the drawings:

FIG. 2 is an end view taken on line 2—2 of FIG. 1 looking in the direction of the arrows and showing the shear bar in place and the crowned portion in the top side of the shear bar support;

FIG. 3 is a plan view of FIG. 2;

FIG. 4 is a fragmentary view showing the slots in the scraper which provide for vertical adjustment of the scraper.

Figure 1:
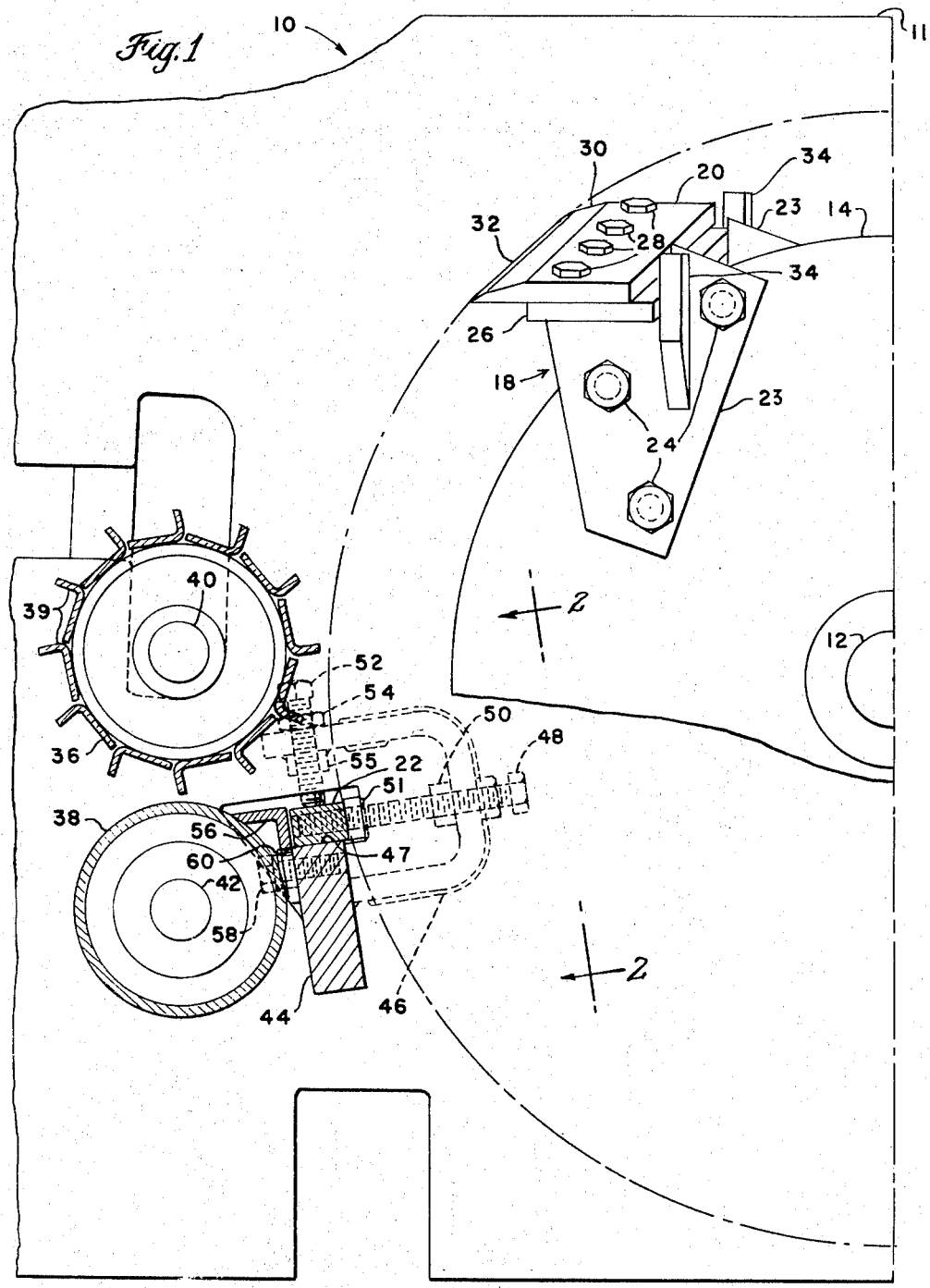
FIG. 1 is a sectional view showing a shear bar assembly constructed according to this invention and showing a portion of the cutter and the cutter cylinder of rotation in dot-and-dash lines.

Referring now to the drawings by numerals of reference, numeral 10 denotes generally a forage harvester cutter having a usual cutter and blower housing, of which two opposite side walls 11—11 are shown. Suitably journalled in walls 11 is a shaft 12 which rotatably supports a cutter or reel having axially spaced end plate means comprising at least two axially spaced end discs, one of which is shown at 14. Carried between discs 14 are a plurality of knife mounting fixtures 18 each of which carries a knife 20. In the drawing, only one knife and its support structure is shown. It is understood, however, that there are three or more knives angularly spaced around the cutter to successively cooperate with a stationary shear bar 22.

Each of the knife mounting fixtures comprises a substantially triangular mounting bracket 23 connected to each of the end discs 14 and held thereto by three mounting bolts 24. A thick, flat knife support plate 26 having a substantially rectangular cross section extends across the axially spaced brackets 23 and is affixed to the brackets by welding or other means. Knife 20 abuts against a flat top side of support plate 26 and is connected rigidly thereto by bolts 28 which pass through the knife central portion. Knife 20 is formed with a flat underside and a top side having a flat rear portion and a forward tapered section 30 which terminates in a knife cutting edge 32. As shown in FIG. 1, the tapered forward section 30 projects beyond support plate 26 and the underside of the section forms an angular pocket with end wall 25. The knife 20 is so mounted that knife edge 32 is located the same radial distance from shaft 12 along its axial extent, and on rotation of the cutter generates a cylinder. A pair of vertical elements 34 are fixed to the support plate 26 and to their respective mounting brackets 23. Elements 34 serve to brace the knife mounting fixture 18 and are adapted to receive set screws (not shown) which bear against the knife 20 to adjustably hold it in place.

With reference to FIG. 1, a pair of feed rolls 36, 38, are spaced forwardly of the cutter and shear bar to receive crop material from the forage harvester header and apron conveyor. Upper feed roll 36 is provided with a plurality of radially extending ribs 39 which provide the roller with gripping surfaces to guard against slippage of the material handled by the rolls. Roll 36 and lower feed roll 38 are suitably journalled in side walls 11—11 on shafts 40 and 42, respectively.

Shear bar 22 is mounted on shear bar support 44 which extends through side walls 11—11, as shown in FIG. 2. A pair of U-shaped fixtures 46 are welded to the shear bar support 44 and side walls 11—11 and serve as a clamping means to fixedly and adjustably hold shear bar 22 in position. A threaded fastener 48 passes through the central portion of fixture 46 and is threadably received in shear bar 22. Lock nuts 50 hold the threaded fastener in a given position relative to fixture 46, and lock nut 51 serves to lock the threaded fastener in shear bar 22. A set screw 52 passes through the upper portion of fixture 46 and is threaded through nut 55 welded to fixture 46. Lock nut 54 holds screw 52 in an adjusted position. The shear bar support is formed with a flat top side 47 which abuts shear bar 22. As shown in FIG. 2 at 49, the support top side is crowned, i.e. it is slightly higher in its medial portion than on its ends. Thus, when the screws 52 in fixtures 46 are drawn down against the ends of shear bar 22, the crown of the support top side 47 will insure positive contact of the bar with the support along its axial extent.

A scraper 56 is mounted on one side of shear bar support 44 and is held thereto by bolts 58. Slots 60 in one side of scraper 56 provide for vertical adjustment of the scraper to regulate the clearance between scraper 56 and smooth feed roll 38. As shown in FIGS. 1 and 3, scraper 56 is generally L-shaped in cross section and extends axially beyond side walls 11—11.

When it is desired to adjust the shear bar 22 relative to the cutter, lock nut 54 is first loosened, and set screw 52 is backed off. Nuts 50 are then turned to move the shear bar in the desired direction. The shear bar to knife clearance is usually maintained between ten and fifteen thousandths. It will be understood that this process is repeated on both sides so that a uniform clearance is obtained along the axial extent of the cutter. When the proper adjustment has been achieved, the nuts 50 are tightened against fixture 46 and set screw 52 is drawn down against shear bar 22. The smooth roll scraper 56 is adjusted relative to the lower feed roll by loosening bolts 58 and moving the scraper to the desired clearance—usually five thousandths to ten thousandths inch. Again, both sides of the scraper must be adjusted.

It will be apparent from the foregoing that a simple and efficient shear bar mounting is provided by the disclosed invention. With this arrangement, the shear bar may be easily installed and removed and adjustments performed, without necessity of gaining access to the interior of the chopper housing. Further, wear of the shear bar is decreased, since a precise adjustment may be easily maintained by the operator. Chatter of the shear bar is prevented by the crowned top side of the shear bar support because the shear bar is positively supported along its axial extent. Scraper 56 serves to keep roll 38 clean and also serves to guide crop material into the chopper; these functions are more efficiently performed by this invention since the scraper can be adjusted to compensate for wear.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. A forage harvester comprising in combination a cutter shaft, end plate means on said shaft and extending radially outwardly relative thereto, at least two brackets on said end plate means, said brackets extending radially outwardly of said shaft and being spaced from each other in an axial direction relative to the shaft, a support plate generally rectangular in cross section extending between said brackets and having ends supported thereon, a knife mounted on one side of said support plate, said knife having a section projecting beyond said support plate in the direction of rotation and said section having a cutting edge thereon, said knife generating a cylinder on rotation, an upper and lower feed roll rotatably mounted with their axes parallel to said cutter shaft, said feed rolls being spaced radially outward from said cylinder, a shear bar support mounted between said cylinder and said feed rolls and generally parallel to said roll axes, a scraper mounted on one side of said support, said scraper having a knife edge immediately adjacent said lower feed roll for removing material therefrom, said scraper being adjustably mounted so that a given clearance can be maintained between the scraper and the lower feed roll, a shear bar on said bar support and mounted for cooperation with said knife, a pair of U-shaped fixtures on said shear bar support and axially spaced on opposite ends of said support, a pair of threaded fasteners in each fixture, one of said fasteners being threadably received in said shear bar and adjustably held in said fixture for moving said bar toward and away from said cylinder, the other of said fasteners being adjustably held in said fixture for movement toward and away from said shear bar to fixedly hold the bar in an adjusted position.

2. A forage harvester, as recited in claim 1, wherein said support bar has a generally flat portion extending between said fixtures which abuts against said shear bar, said flat portion being slightly higher in its medial portion than on its ends adjacent said fixtures so that said shear bar firmly contacts said flat portion along its axial extent to eliminate chatter of the shear bar.

3. A forage harvester, as recited in claim 1, wherein said scraper is formed of two sides and is substantially L-shaped in cross section, a first scraper side is parallel to said one support side, a second scraper side is generally tangential to one of said feed rolls, said first scraper side is formed with vertically extending slots, bolts extend through the slots and are threadably received in said shear bar support, whereby said scraper may be vertically adjusted relative to said shear bar support to adjust the clearance between said lower feed roll and said second side.

4. A foreage harvester comprising in combination a rotatably mounted cutter, an axially extending knife which generates a cylinder on rotation, a pair of feed rolls for feeding crop material to said cutter, said rolls being parallel to one another and spaced one above the other, said rolls being spaced radially outward from said cylinder, a shear bar support mounted between said feed rolls and said cylinder, a shear bar on a top side of said support for cooperation with said knife, a scraper mounted on a generally vertically extending side of said support for removing material from one of said feed rolls, said scraper being adjustable relative to said support, and clamp means on said shear bar support for adjustably holding said shear bar in a given position on the support, and said scraper and shear bar being adjustable independently of each other.

5. A forage harvester, as recited in claim 4, wherein said cutter is enclosed in a housing and said housing comprises a pair of vertical side walls on opposite sides of said cutter, said walls have interior sides adjacent said cutter and opposite exterior sides; said shear bar support extends through said walls and said clamp means is located adjacent said exterior walls so that said shear bar may be adjusted without access to the interior of said housing.

6. A forage harvester, as recited in claim 5, wherein said clamp means comprises a pair of U-shaped fixtures on said shear bar support and axially spaced on opposite ends of said support, a pair of threaded fasteners in each fixture, one of said fasteners being threadably received in said shear bar and adjustably held in said fixture for moving said bar toward and away from said cylinder, and the other of said fasteners being adjustably held in said fixture for movement into contact with said shear bar to fixedly hold the bar in an adjusted position.

7. A forage harvester, as recited in claim 6, wherein said support top side has a crowned portion intermediate its ends so that when said shear bar is securely clamped to said support by said clamp means the bar will firmly contact said top side along its axial extent.

8. A forage harvester, as recited in claim 7, wherein said scraper is formed with two sides and is substantially L-shaped in cross section, a first scraper side is parallel to said vertically extending side, a second scraper side is generally tangential to said one feel roll, said first scraper side is formed with vertically extending slots, fastening means extend through the slots and are threadably received in said shear bar support, and said scraper is movable vertically to adjust the clearance between said one feed roll and said second side.

References Cited
UNITED STATES PATENTS

| | | | |
|---|---|---|---|
| 2,139,868 | 12/1938 | Thieman | 146—120 |
| 2,399,529 | 4/1946 | Willits. | |
| 2,735,569 | 2/1956 | West | 146—117 |
| 2,860,677 | 11/1958 | West et al. | 146—117 |

W. GRAYDON ABERCROMBIE, *Primary Examiner.*

Disclaimer

3,342,231.—*Thomas W. Waldrop*, Ronks, Pa. FORAGE HARVESTER. Patent dated Sept. 19, 1967. Disclaimer filed June 8, 1981, by the assignee, *Sperry Corp.*

Hereby enters this disclaimer to claims 4 and 5 of said patent.

[*Official Gazette June 1, 1982.*]